Oct. 9, 1962 S. A. SCHERBATSKOY 3,058,000
DIFFUSION LOGGING
Filed Dec. 13, 1957 3 Sheets-Sheet 1

INVENTOR.
Serge A. Scherbatskoy

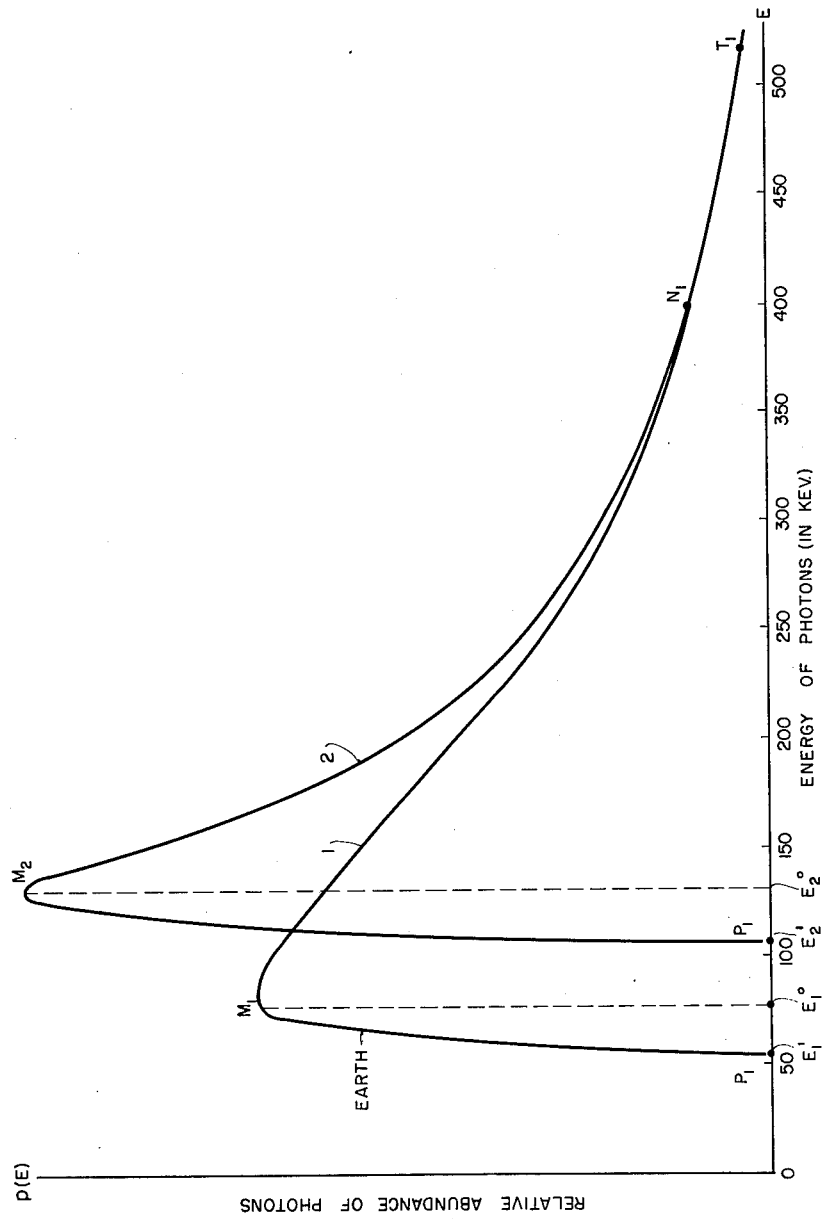

United States Patent Office 3,058,000
Patented Oct. 9, 1962

3,058,000
DIFFUSION LOGGING
Serge A. Scherbatskoy, 804 Wright Bldg., Tulsa 3, Okla.
Filed Dec. 13, 1957, Ser. No. 702,645
3 Claims. (Cl. 250—71.5)

This invention relates to prospecting for minerals and other geological deposits located in the earth and to the logging of the subsurface formations traversed by a well or bore hole. More particularly, this invention is directed to well logging utilizing a source of gamma rays or X-rays for irradiating the formations traversed by the bore hole, and a photon detector for detecting soft gamma rays or X-rays resulting from the interaction of said primary rays with said formations.

This application is a continuation-in-part of my copending application Serial No. 401,978, enittled Radiation Detector, filed January 4, 1954, now Patent No. 2,881,324; Serial No. 505,086, entitled Nuclear Measuring System, filed May 2, 1955, now Patent No. 2,946,888; Serial No. 528,675, entitled Gamma Ray Testing, filed August 16, 1955, now Patent No. 2,997,586; and Serial No. 646,413, entitled Radiation Detecting, filed March 15, 1957, now Patent No. 3,008,048.

Well logging methods have been developed that are generally known as gamma-gamma logging. These methods utilized a source of gamma rays for irradiating the formations, and a detector of gamma rays for detecting the gamma rays scattered by Compton scattering in the formations. The method which is the subject of the present invention provides a measurement that indicates primarily the relative abundance of an element that may be present in the formation and which is characterized by a high atomic number.

In order that the invention may be more fully understood, reference is made to the accompanying drawings which illustrate diagrammatically, and by way of example several embodiments thereof, and in which.

Figure 3:
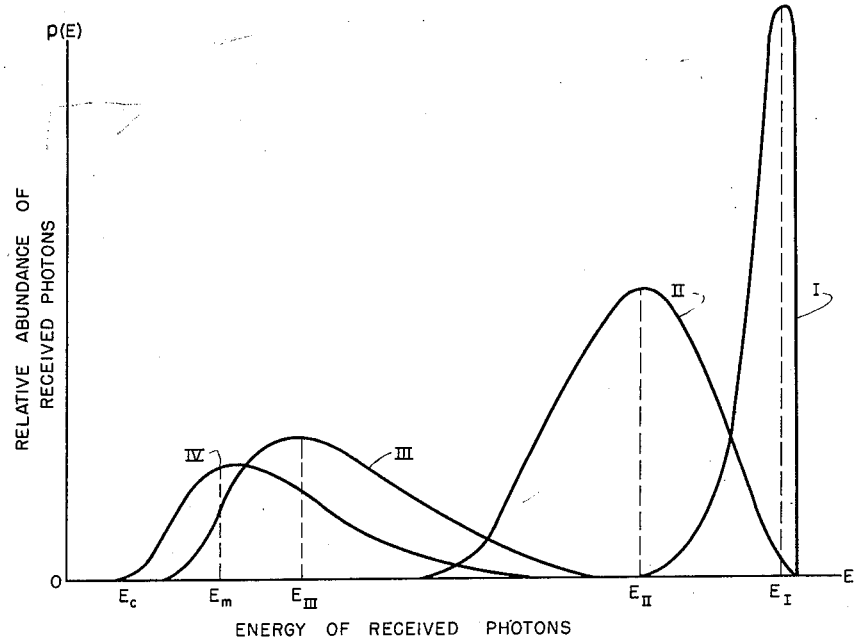
Figure 1:
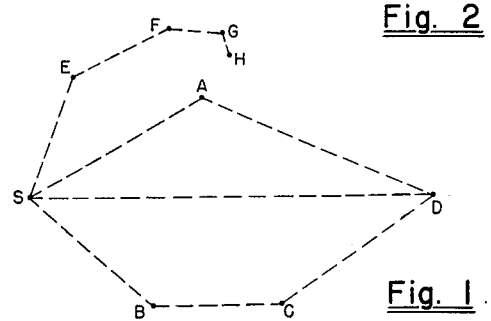
FIG. 1 is a schematic view showing a source of radiation S, a detector of radiation D, and various paths of photons emitted by S.

FIG. 3 shows curves I, II, III, and IV representing the energy spectra of photons detected at the point D of FIG. 1 and emitted by the source S, said curves corresponding gradually increasing distances from the source to the detector. The abscissas represent the energies $E$ of the received photons and the ordinate $p(E)$ represent the corresponding abundance of the received photons. Thus the value $p(E)dE$ represents the number of photons having energy larger than $E$ and smaller than $E+dE$.

FIG. 4 represents the characteristic spectra of two media. The abscissas represent the energies $E$ and the ordinates the corresponding abundance $p(E)$, so that the value $p(E)dE$ represents the number of received photons having energy larger than $E$ and smaller than $E+dE$.

Figure 5:
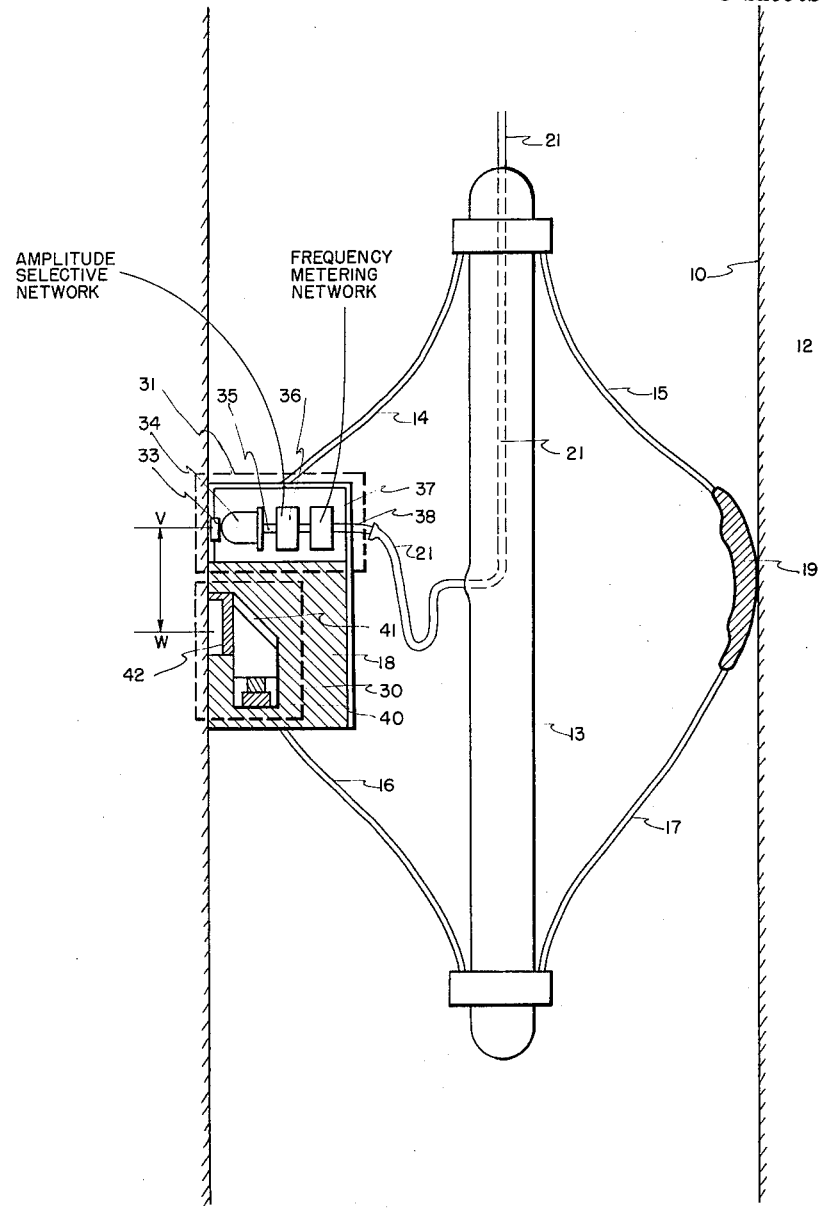

FIG. 5 is a schematic view of a well logging probe of the present invention disposed in a bore hole with associated apparatus, said probe comprising a means for detecting radiation within a preselected energy range.

It is now well recognized that when a source of gamma rays is passed through a bore hole so that the gamma rays pass outwardly from the source into the surrounding formations, a process designated as Compton scattering takes place. In accordance with this process the incident gamma rays radiated by the source interact with the orbital electrons of various atoms present in the formation. This interaction is essentially a collision between the incident high energy photon and an electron and as a result of this collision a portion of the energy of the incident photon is imparted to the electron which is ejected from its orbit. The remainder of the energy of the incident photon is carried by the scattered photon which is deflected from the course of the original photon, and can be detected by means of a suitable gamma ray detector conveniently distant from the source. This type of logging is designated as gamma-gamma logging and provides information regarding the density of formations traversing a bore hole.

The present invention differs from the above referred to type of logging and the objective of the present invention is to provide an index that is particularly sensitive to the presence of a preselected element that may be present in the formation and thus to provide a log indicating the variation of the relative content of said element in the earth formation. The prior art provided an index based on Compton scattering and the measurements of the scattered photons were in a relatively high energy range. The present invention is based on the photoelectric absorption of photons and utilizes the property of certain preselected elements according to which the element absorbs selectively gamma radiation within a determined energy range, said range depending upon the atomic number $Z$ of the element. The present invention differs therefore from the prior art since it utilizes a certain particular energy range of scattered photons that is selectively absorbed by the element under consideration.

Assume now, as shown in FIG. 1, that a source of gamma rays is located at a point S in a given medium M, and a detector of radiation is positioned at point D within said medium, and at suitable distance $d$ from the point S. It is apparent that the photons emitted by the source S interact with the surrounding medium and in considering this interaction, we should differentiate between the two competing effects, i.e. the Compton collision and the photoelectric effect. These two effects depend on two different properties of the medium, i.e. the Compton interaction is approximately a function of density, whereas the photoelectric interaction is a very sensitive function of the atomic number of the medium. In accordance with the Compton effect, the photon emitted by the source S is scattered by the medium before it reaches the detector D. Therefore, the more pronounced is the Compton effect, i.e. the denser is the medium, the more scattering takes place. It is well known that the Compton scattering is accompanied by a degradation in energy of photons, and therefore we have within the medium M a flux of photons having an energy spectrum extending to values considerably below the energy of the photons emitted by the source S. Because of the photoelectric effect, a portion of these low energy photons within a determined energy range is absorbed by the medium M. This energy range is determined by the atomic number of the elements in the medium M, i.e. the higher the atomic number the higher is the energy of the photons absorbed by the medium M. We may consider the situation in which the medium M contains a predetermined element in an unknown quantity but of known atomic number $Z$. It is well known that to a given value of the atomic number $Z$, corresponds a determined energy range of photons absorbed due to photoelectric effect. Therefore, the larger the amount of said element in the medium the more effective is the photoelectric absorption in this eneregy range, and the smaller is the number of photons in this energy range that is detected at the point D. Therefore, the number of photons in said critical energy range may provide an index representing the abundance of an element in the medium M, said element having an atomic number Z corresponding to said critical range.

We have shown in FIG. 1 several trajectories of photons emitted by the source S. Thus the trajectory SD represents a photon emitted by S which reached the detector D without undergoing any scattering; the trajectory SAD includes a single scattering at the point A, and the trajectory SBCD includes two scatterings at points B and C. In the trajectory SEFGH scattering took place at points E, F, and G and as a result of these scatterings the photon energy was degraded until it reached a critical value corresponding to the photoelectric absorption of the element present in the medium having an atomic number Z. Usually a relatively small amount of said element causes considerable photoelectric absorption because of the large photoelectric cross section and great energy selectivity which characterizes photoelectric absorption.

Figure 2:
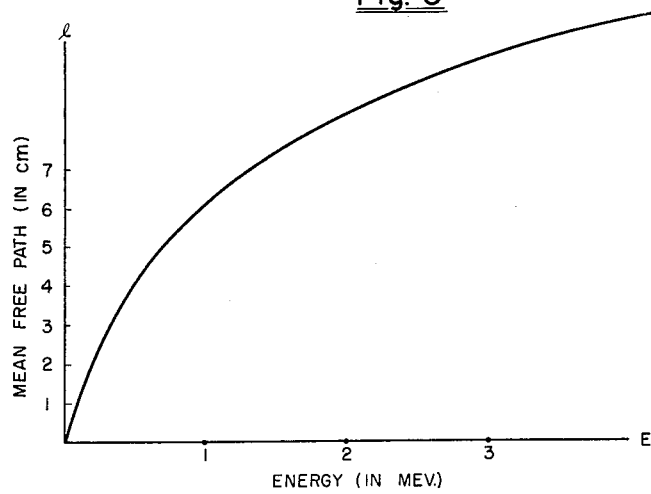
FIG. 2 shows a graph representing the dependence between the eneregy of a photon emitted by the source S in a medium having similar chemical composition to that of ordinary earth and the corresponding mean free path of the photon. The abscissas represent the energy in mev. and the ordinates represent the mean free path in cm.

Consider now FIG. 2 in which the abscissa represents the energy E (in mev.) of a photon emitted by the source S, and the ordinate represents the mean free path $l$ (in cm.) corresponding to the energy E in a medium M which is assumed to be earth. It is well known that the mean free path $l$ (in cm.) is the inverse of the macroscopic cross section $s$ (in cm.$^{-1}$) said cross section representing the effect of the Compton scattering and of the photoelectric absorption, i.e.

$$l = \frac{1}{s} \quad (1)$$

Furthermore $$n = n_0 l^{-sd} \quad (2)$$

where $n_0$ represents the number of photons emitted by the source S within a narrow beam of specified cross section in the direction SD, $n$ represents the number of unscattered photons detected at D, and $d$ represents the distance between the source S and the detector D. It is apparent that when $d=l$ we have from 1 and 2

$$\frac{n}{n_0} = l^{-1} \sim \frac{1}{2.7} \sim \frac{1}{3} \quad (3)$$

Therefore, when the distance SD in FIG. 1 is equal to the mean free path $l$, about ⅓ of the photons emitted by the source S reach the detector D without undergoing a single scattering. Referring now to FIG. 2, it is seen that the mean free path $l$ is a very sensitive function of the energy of E of the photons, i.e. the value $l$ increases very rapidly with the value E.

Assume now that the source S emits photons of energy $E=1$ mev. Referring to FIG. 2, it is seen that the corresponding mean free path is $l=6$ cm. Therefore, if the distance $d$ from the source to the detector does not exceed very much the value $l=6$ cm., a substantial portion of the photons arriving at D will have energy that does not differ very much from the value $E=1$ mev., i.e. the energy spectrum of the photons received at the point D will be influenced to a very great degree by the characteristic of the source, i.e. by the energy of the photons emitted by S. Referring now to FIG. 3, the curve I represents the energy spectrum of the photons received at D. It is seen that the main portion of the photons received at D has the energy $E=1$ mev. or slightly below 1 mev. The number of degraded photons having energy much smaller than 1 mev. is relatively small. The most probable value of E in this distribution is the value $E_I$, said value $E_I$ representing the abscissa corresponding to the peak of the curve I.

If the distance $d$ becomes larger than $l=6$ cm., then we detect a larger number of scattered, degraded photons and the energy distribution has a format represented by the curve II. In this distribution the most probable energy value has a value $E_{II}$, said value $E_{II}$ representing the abscissa corresponding to the peak of the curve II. It is apparent that $E_{II}$ is smaller than $E_I$. For still larger values of $d$ the received spectrum has a form represented by the curve III, in which the most probable value $E_{III}$ is decreased further. It is important to note, however, that when the distance $d$ increases indefinitely and assumes values large as compared to the mean free path of the emitted photon, then the spectrum of photons received at D tends asymptotically to the form IV which is characterized by a maximum value $E_m$ and a cut-off value $E_c$. Furthermore, the asymptotic form IV is substantially independent of the energy of the photons emitted by the source S and depends primarily on the character of the medium.

It is apparent that in the representation such as in FIG. 3 the abscissas represent the energies of the received photons, and the ordinates $p(E)$ are such that the value $p(E)dE$ represents the number of received photons between the values E and $E+dE$. Thus the total area defined as $$\int_0^\infty p(E) dE$$

and corresponding to either of the curves I, II, II, or IV represent the total number of received photons. All these curves are normalized to the same value, i.e. the respective areas defined by said curves are equal one to the other.

We shall designate the form IV of FIG. 3 representing the limiting form for increasing values of $d$ as the "characteristic spectrum of the medium." The characteristic spectrum represents essentially the nature of the formation and is substantially independent of the energy of the photons emitted by the source, said photons being either monoenergetic or heteroenergetic. In order to produce the characteristic spectrum it is necessary that the value $d$ be very large when compared to the mean free path of photons emitted by the source S, i.e. the value $d/l$ should be large.

In well logging applications there are certain geometrical limitations controlling the distance $d$, i.e. the distance between the source and the detector cannot always be very large. Therefore, in order to produce the characteristic spectrum of the formation, i.e. in order to have $d/l$ large, it is necessary to have the mean free path $l$ small when compared to the distance $d$. Referring now to FIG. 2, it is seen that small values of $l$ correspond to small energies of photons emitted by S. Therefore, it is sometimes desirable for well logging purposes to have a source of soft gamma rays or of X-rays.

Let $d_1$ represent the distance between the source of gamma rays and the detector of gamma rays in a well logging instrument, and let $E_1$ be the energy of the photon intercepted by the detector. We refer now to the diagram of FIG. 2 and designate by $l_1$ the mean free path corresponding to the value $E_1$. We are particularly interested in two types of well logging: The "gamma-gamma scattering log" in which the mean free path is large or of the same order of magnitude as the spacing between the source and the detector, i.e. $l_1 > d_1$ or $l \sim d_1$, and the "gamma-gamma diffusion log" in which the mean free path is small as compared to the spacing between the source and the detector, i.e. $l_1 \ll d_1$.

In accordance with the principles of the "gamma-gamma scattering log," the photons emitted by the source undergo one or several Compton scatterings as a result of which the scattered photons are received at the detector and the frequency of occurrence of the said scattered photons indicates the density of the formations traversed by the bore hole. Thus, for instance, the "scattering log" can be obtained by using such source as Co$^{60}$ emitting photons having energy of about 1.2 mev. and enclosing the detector with a steel container, which screens effectively all incident soft gamma rays and X-rays. Thus the gamma-gamma scattering log uses a source of hard gamma rays and a detector that is screened from the incident very soft gamma rays and X-rays.

The "gamma-gamma diffusion logging" is a new type of logging that has not been known heretofore. In accordance with this method, the photons after having reached a certain distance from the detector undergo a diffusion process which reaches a certain form of spectral equilibrium determined primarily by the photoelectric effect. One of the essential differences between the above two types of logging methods is the fact that in a "gamma-gamma scattering log" the spectrum of the received radiation depends strongly on the spectrum of the radiation emitted by the source. On the other hand, in "gamma-gamma diffusion logging" the spectrum of the received radiation is the "characteristic spectrum" of the formation and therefore does not depend substantially on the spectrum of the radiation emitted by the source. The gamma-gamma diffusion log can be produced by using a source of hard gamma rays and a detector that is selectively responsive to soft gamma rays, the energy of the said soft gamma rays being related in a predetermined manner to the spacing between the source and the detector. A preferred method of obtaining a diffusion log is by means of a source of soft gamma rays having energies related in a predetermined manner to the spacing between the source and the detector. If we use for diffusion logging a source of hard gamma rays such as $Co^{60}$, it is essential that the spacing between the source and the detector be large as compared to the mean free path of the photons to which the detector is selectively responsive. Such a requirement is desirable, but not as essential in diffusion logging when utilizing a source of soft gamma rays or X-rays.

Consider now FIG. 4 which shows the "characteristic spectra" of two media. Curve 1 represents the characteristic spectrum of a medium having a relatively low effective atomic number such as earth, and curve 2 represents the characteristic spectrum of a medium having a relatively high atomic number, such as vanadium, iron, uranium, etc. It is apparent that the "characteristic spectrum" depends essentially on the atomic number or the "effective atomic number" in case of a composite medium such as earth. As stated above, the "characteristic spectrum" represents the spectral distribution of the photons at a selected point within said medium and detected at a distance $d$ from the source, the said distance $d$ being large as compared to the mean free path of the most energetic photon emitted by the source. In the representation such as in FIG. 4, the abscissas represent the energies of the received photons (in kev.) and the ordinate $p(E)$ is such that the value $p(E)dE$ represents the number of received photons comprised between the values $E$ and $E+dE$. Thus, the total area defined as $$\int_0^\infty p(E)dE$$

represents the total number of received photons. (In describing my invention I make reference to the "number of photons" and "total number of received photons." By these statements I mean the total number received per unit of time. This is fairly obvious and reference to time has been omitted in order to make the presentation of the theories more concise and clear.) The curves 1 and 2 are normalized to the same value, i.e. the area defined by the curve 1 is equal to the area defined by the curve 2. It is apparent that for the high energy region, i.e. for $E>450$ kev. both curves coincide. This is the region of Compton scattering that is insensitive to differences in the atomic number of the medium. In this region the characteristic spectrum of earth is substantially the same as the characteristic spectrum of a metallic body. On the other hand, for values $E<450$ kev. there is considerable difference between the spectrum 1 and the spectrum 2. Consider now the curve 1 of FIG. 4 representing the "characteristic spectrum" of ordinary earth. In this spectrum there is an energy value $E_1^0$ at which the photons are the most abundant. We shall define $E_1^0$ as the "characteristic energy."

For values $E>E_1^0$ the curve 1 decreases slowly and tends asymptotically to zero. In this region we shall consider two portions of the curve: The portion $M_1N_1$ in which the Compton effect tends to be more dominant than the photoelectric effect when E approaches the value in the neighborhood of 450 kev., and the portion extending beyond the point $N_1$ towards the point T, in which the Compton effect dominates, said latter portion being substantially independent of the atomic number and therefore common to all media. It is apparent that the characteristic spectrum 1 does not extend indefinitely to very high energies and that the upper energy limit is determined by the energy of the source emitting photons into said medium.

Of particular importance in connection with the present invention is the portion of the characteristic spectrum corresponding to values $E<E_1^0$, i.e. the energy values less than the characteristic energy. It is seen that the curve 1 decreases very abruptly for decreasing values of E and reaches value zero for $E=E_1^1$. The value $E_1^1$ is somewhat smaller than the value $E_1^0$ and we shall define any energy value that is larger than $E_1^1$ but smaller than $E_1^0$ as the "effective energy" of a given medium. It is thus apparent that for photons having an "effective energy" value the photoelectric effect is the dominant factor. Therefore, photons having an effective energy value are very strongly absorbed by the medium due to the photoelectric interactions and the Compton effect is practically non-existent.

Similar considerations apply to the curve 2 representing the characteristic spectrum of an element of high atomic number that may be present in the formation (such as a metallic ore or chlorine). In this case, the characteristic energy is represented by the value $E_2^0$ (corresponding to the ordinate of the point $M_1^1$). For energies smaller than $E_2^0$ the curve 2 decreases very steeply and reaches zero for $E=E_2^1$. Therefore, the "effective energy" for the medium represented by the curve 2 is an energy value that is smaller than $E_2^0$ and larger than the value $E_2^1$.

It is noted that the effective energy of a given medium is a very sensitive function of the atomic number of the medium. Thus the effective energy of a metallic body (having high Z) and represented by the curve 2 is larger than the effective energy of the earth (having low Z) and represented by curve 1. Thus the "effective energy" increases with the atomic number of the medium.

In our particular case we have a "background medium" of relatively low atomic number and represented by the curve 1. Let $E_1$ be the effective energy of the background medium. Our problem consists in determining quantitatively the amounts of material of high atomic number that may be present in varying quantities in said background medium. Let $E_2$ be the effective energy of said material of high atomic number. It is apparent that $E_2>E_1$. In our case the background medium may be, for instance, the earth formations traversed by the bore hole and the material of high atomic number may be a material such as calcium, chlorine or a metallic ore. Assume, for example, that $E_1$ is about 60 kev. and $E_2$ is about 125 kev. It is thus apparent that in an earth formation that does not contain for example the metallic ore, the characteristic spectrum does not contain energy components substantially below 60 kev., but does contain energy components above 60 kev. If, however, the earth formation contains metallic ore, there occurs a very effective absorption of the photons below the energy value of 125 kev., whereas the abundance of photons above the value 125 kev. is substantially unaffected.

The photoelectric absorption of gamma rays in a medium is governed by the formula:

$$\sigma_k = \frac{CZ^5}{W_\gamma^{7/2}} \text{cm.}^2$$

Where $\sigma_k$ is the coefficient of photoelectric absorption, C is a constant approximately equal to $10^{-33}$, Z is the atomic number and W is the gamma ray energy in mev. Thus, even though the atomic numbers of the materials investigated differ by relatively small factors, under the proper conditions this logging method is capable of differentiating between them. As can be seen from the above formula, the photoelectric absorption of gamma rays in a medium is proportional to $Z^5$ and thus it is possible to determine even relatively small amounts of higher atomic number elements when they are present in the ordinary earth. A factor of two in the atomic number corresponds to a factor of 32 in the photoelectric absorption. Usually a factor of 2 in the Z of elements even when present in relatively low concentration can be easily detected.

For purposes of illustration of this invention, I have divided the elements into two groups: Group (1) I shall call "Substances of Low Atomic Number" and include materials in the range of Z from 1 to 14, inclusive. Group (2) I shall call "Substances of High Atomic Number" and these include elements of Z from 15 to 92, inclusive. Ordinary earth formations, when the pore spaces are filled with oil or fresh water, contain mostly elements hydrogen, carbon, oxygen, aluminum, silicon, and thus consist predominantly of "Substances of Low Atomic Number." Other formations may contain metallic ores, calcium, and when the pore spaces contain salt water, considerable quantities of chlorine, and these materials fall into group (2) "Substances of High Atomic Number."

Referring now to FIG. 5, there is shown a bore hole 10 containing drilling mud 11. One form of apparatus suitable for logging of the formation 12 traversed by the bore hole 10 may comprise an elongated cylindrical housing 13 slidably supporting oppositely disposed bowed upper springs 14 and 15 and corresponding lower springs 16 and 17. The springs 14 and 16 are arranged to hold a logging probe 18 resiliently against the wall of the bore hole 10. The springs 15 and 17 support a pad 19 pressed against the opposite side of the bore hole to balance the force exerted by the springs 14 and 16 and thus maintain the housing 13 substantially centered in the bore hole. Other well known means for supporting and urging the logging probe 18 against the wall of the bore hole 10 may, of course, be employed. A cable 21 is secured to the housing 13 to raise and lower the apparatus in the bore hole in a well known manner and incorporates electrical conductors for making connections with indicating apparatus on the earth's surface.

The probe 18 comprises a source of X-rays or gamma rays comprised within the dotted rectangle 30 and a detecting arrangement comprised within the dotted rectangle 31.

For a source 30 I may choose any of the well known gamma-emitting radioisotopes. We are particularly interested in isotopes emitting soft gamma rays such as $Sn^{113}$ emitting photons of energies 65 kev. and 24 kev. or any other commercially available low energy sources. I may also provide an alternate radiation source as shown within the dotted rectangle 30. It consists essentially of a beta ray emitter 40 such as $Sr^{90}$—$Y^{90}$ emitting beta rays that are arranged to strike a target 41 consisting of a material of a high atomic number. The resulting X-rays are due to bremsstrahlung and are also caused by ionization in the K shell of target atoms with subsequent emission of characteristic K-radiation. A thin plastic shield 42 is provided to protect the source from various extraneous effects.

The detector of radiation comprised within the block 31 consists of a phosphor 33 and photomultiplier 34. Power is supplied to the photomultiplier 34 in conventional manner and the output pulses are transmitted from the photomultiplier 34 through the leads 35 to an amplitude selective network 36. If necessary an amplifier is provided between the photomultiplier and the selective network. This is conventional and is not shown for reasons of clarity of illustration. The pulses at the output of the photomultiplier 34 have magnitudes that are proportional to the energy of the photons intercepted by the phosphor 33. The network 36 is arranged to transmit only those impulses that are contained within a predetermined range of magnitude and therefore this arrangement is adapted to selectively respond only to those photons that are comprised within a predetermined energy range. A frequency metering network 37 is connected to the output of the network 36 and provides across its output terminals 38 a voltage that represents the rate of occurrence of the pulses thus received. This D.C. voltage is transmitted by means of the cable 21 to the top of the bore hole. (All the equipment illustrated requires conventional power supplies and these are not shown for reasons of clarity of presentation).

As stated hereinabove, the formation penetrated by the bore hole has a characteristic spectrum defined by the curve 1 in FIG. 4 and we assumed that its "effective energy," i.e. the energy at which the photoelectric effect dominates all other interaction, is about 60 kev. This formation contains a metallic ore, the amount of which varies for various depths of the bore hole. This metallic ore has a characteristic spectrum defined by the curve 2 in FIG. 4 and we assume that its "effective energy" is about 125 kev. The object of my invention is to provide a log representing the varying amounts of the ore in the said formation for various depths of said bore hole, and I can accomplish this by means of two methods designated, respectively, as method A and method B.

In the method A I provide a means for producing in the formation a flux of photons that undergo diffusion in the surrounding medium and reach the detector at an energy distribution corresponding to the characteristic spectrum of the medium. Therefore, the first fundamental step of the method A is the initiation of the photon diffusion process in the medium to be explored and thus to produce at the detecting position the characteristic spectrum of the medium. The second fundamental step of the method A is to adjust the selectivity of the detector so as to make it selectively responsive to a certain energy range of photons, that are normally present in the characteristic spectrum of the medium if said medium does not contain the metal to be detected. Furthermore, this energy range should not be present in the characteristic spectrum of the metallic body that we desire to detect.

In order to accomplish the first fundamental step in the method A, we should recognize the existence of a predetermined dependence between the distance $d$ from the source to the detector and the energy range of photons that we wish to to detect. Namely, we should detect only those photons which have a mean free path that is small when compared to the distance $d$. Referring now to FIG. 2, it is apparent that the low energy photons, i.e. X-rays, satisfy the above requirement. Therefore, if we choose, for instance, for the source S in FIG. 1 a source of gamma rays such as $Co^{60}$ emitting gamma rays of energy about 1.2 mev., the mean free path of these photons is $l \sim 7$ cm. as shown in FIG. 2. Assume that the distance $l=SD$ in FIG. 1 is equal to 6 cm. Then the significant photons that we wish to detect should have a mean free path small when compared to the distance between the source and the detector. Thus, said mean free path should be less than ½ and preferably less than ⅕ the distance VW representing in FIG. 5 and FIG. 6 the spacing between the source of radiation and the detector. As shown in FIG. 1, a mean free path of about 1.5 cm. corresponds to photons of $E=100$ kev. and therefore in order to achieve efficient operation we should make the detector responsive to the energies of photons that are below about 100 kev. Only a portion of the spectrum received at the detector represents the "effective energy" of the formation surveyed and namely the portion below about 100 kev. The photons of higher energy represent the result of single or multiple scattering and this portion must be eliminated from the detector since we are interested only in the diffusion process.

The above process utilizing a source of hard gamma rays is not always very efficient for diffusion logging especially when we wish to keep the distance VW of FIG. 5 small and in many instances it is preferred to use a source of soft gamma rays or of X-rays. In such instances it is desirable, although not essential, to make the spacing between the source and the detector large as compared to the mean free path of the photons emitted by the source. It is, however, important that the radiation received contain photons within the energy range of "effective energy" of the metallic ore, i.e. of about 125 kev., and photons of energies below this value. As shown in FIG. 5, the pulse height selective network 36 connected to the photomultiplier 34 should be designed so as to selectively transmit only those impulses that correspond to the energy range of photons below the effective energy of the metallic ore, but above the effective energy of the earth formation, i.e. below the value of 125 kev., but above the value of 60 kev. It is thus apparent that in this arrangement the output voltage derived from the frequency metering network 37 will serve as an index of the amount of the metallic ore present in the formation. In case the formation does not contain the metallic ore, there is a relatively abundance of photons having energies above 60 kev. and below 125 kev. However, if the metallic ore is present, many of these photons are absorbed and the number of absorbed photons increases in a formation containing a larger amount of the metallic ore. Consequently, the smaller is the voltage obtained from the frequent metering network 37, the larger is the percentage of metallic ore in the formations penetrated by the drill hole.

It is apparent that in the above method A the selectivity of the receiving arrangement contained in the block 30 is adjusted in accordance with the effective energy characterizing the metallic ore.

In the method B the receiving arrangement in the block 30 need not be particularly selective, i.e. I can eliminate the amplitude-selective network 36 and connect the output of the photomultiplier 34 directly to the frequency metering network 37 so that the output of the network 37 will produce a voltage representing the frequency of occurence of photons of all energy ranges received by the detector. It is, however, important in method B to select a source that emits photons having energies that are above the "effective energy" of the earth formation, and below the "effective energy" of the metallic ore. In the case of the above example, the source should emit photons above 60 kev. but below 125 kev. Such a source may be, for instance, $Nb^{91}$ emitting photons having energies of about 103 kev. It is thus apparent that the output voltage derived from the frequency metering network 37 will serve as an index of the metallic ore present in the formation. In case the formation does not contain the metallic ore, the photons emitted by the source 31 are detected by the detector 30 and the output voltage across the terminals of the frequency metering network 37 will have a relatively large value. However, if the metallic ore is present, a number of photons will be absorbed and consequently the voltage obtained from the frequency metering network 37 will be smaller. Consequently, the smaller is this voltage, the larger is the percentage of the metallic ore in the formation.

In operation, the logging apparatus is raised through the well by the cable 21, while the probe 18 bears against the wall of the bore hole. Thus the output of the frequency network 37 is logged as a function of the position of the probe 18 as it is moved along the bore hole, and we obtain an indication of the amounts of the metallic ore encountered at various depths.

It is apparent that the method and apparatus described in the present application can also be used for surface prospecting for various minerals and other deposits. In such case, the unit 18 shown in FIG. 5 need not be lowered in a drill hole, but can be moved along the surface of the earth in a manner well known to those skilled in the geophysical prospecting art.

The term "gamma rays" or "gamma radiation" or "photons" used in the claims is meant to designate penetrating radiation of photons, i.e. of particles having zero rest mass. Therefore, the terms "gamma rays" or 'gamma radiation" used in the claims are meant to include hard gamma rays, soft gamma rays, X-rays, and still softer radiation known in the art as "Grenzstrahlen."

I claim:

1. A well logging method for measuring the amounts of a specific substance in materials traversed by a drill hole, said specific substance having a first effective energy and said materials having a second effective energy, said first effective energy being higher than said second effective energy, comprising the step of lowering into said drill hole a source of photons having energy higher than said first effective energy and said second effective energy, detecting radiations that return from the formations after the interaction and scattering of said photons within said specific substance and said materials, counting from said detected radiations the radiations lying within a predetermined energy band located so that its upper limit is lower than said first effective energy and higher than said second effective energy, and recording the rate of occurrence of said counted radiations in said band.

2. A method for determining the relative quantities in the formations adjacent the walls of a bore hole of substances having atomic numbers that are high compared to the atomic numbers of the elements abundant in said formations, comprising the steps of irradiating the formations adjoining the bore hole at a predetermined depth therein with photons higher in energy than the characteristic photoelectric absorption energy of such substances, said photons undergoing scattering within the formations and thereby undergoing energy degradation to energy values below said characteristic absorption energy of said substances, detecting within the bore hole photons returning thereto from the formations, measuring the relative intensity of the detected photons having energies in a selected range lying between such characteristic energy of said substances and the characteristic photoelectric absorption energy of said abundant elements, repeating the foregoing steps for different depths in the bore hole, and recording such relative intensities as a function of depth.

3. A well logging method for determining the varying amounts of a substance of high atomic number in the formations traversed by a drill hole, said substance being adapted to absorbed photons of a determined energy range as a result of photoelectric interaction, such range being above the range of photon energies photoelectrically absorbed by the abundant earth elements, comprising the step of lowering in said drill hole a source of photons having energies exceeding those in said determined energy range, thereby irradiating the formations traversed by said drill hole, detecting photons at a determined distance from said source, said distance being large when compared to the mean free path of photons of said determined energy range in said formations, selectively receiving photons within said determined energy range that return to the drill hole after interacting and scattering within said formations, and measuring the rate of occurrence of said selectively detected photons.

References Cited in the file of this patent

UNITED STATES PATENTS

| Re. 24,383 | McKay | Oct. 29, 1957 |
| 2,469,461 | Russell | May 10, 1949 |
| 2,635,192 | Cordovi | Apr. 14, 1953 |
| 2,659,011 | Youmans et al. | Nov. 10, 1953 |

(Other references on following page)

UNITED STATES PATENTS

| | | |
|---|---|---|
| 2,665,385 | Herzog | Jan. 5, 1954 |
| 2,711,482 | Goodman | June 21, 1955 |
| 2,721,944 | Rubble | Oct. 25, 1955 |
| 2,725,485 | Scherbatskoy | Nov. 29, 1955 |
| 2,769,918 | Tittle | Nov. 6, 1956 |
| 2,923,824 | Martin et al. | Feb. 2, 1960 |

OTHER REFERENCES

Acta Radiologcia Supplementum, by A. Engstrom, published in 1946, pages 27–31.

Nuclear Radiation Physics, by Lapp et al. published by Prentice Hall Co. in 1954, pages 114–117.

Clark: Applied X-Rays, published by McGraw-Hill Book Co., Inc., New York, 1955, pp. 181 to 186.

Jakovlev: Quantitative Determination of Impurities in High-Purity Metals . . . , Peaceful Uses of Atomic Energy, vol. 15, published by the U.N. in 1956, pp. 54 to 59.

Caldwell: Nuclear Physics in Petroleum Exploration Research, World Petroleum, vol. 27, No. 4, April 1956, pp. 59 to 63.

Elements of X-Ray Diffraction, by Cullity, published by Addison-Wesley Co., Reading, Mass., 1956, pages 10 to 16.

UNITED STATES PATENT OFFICE
CERTIFICATE OF CORRECTION

Patent No. 3,058,000                  October 9, 1962

Serge A. Scherbatskoy

It is hereby certified that error appears in the above numbered patent requiring correction and that the said Letters Patent should read as corrected below.

Column 1, lines 51 and 52, after "corresponding" insert -- to --; column 3, line 71, for "formut" read -- form --; column 9, line 27, for "relatively" read -- relative --.

Signed and sealed this 19th day of March 1963.

(SEAL)
Attest:

ESTON G. JOHNSON                              DAVID L. LADD
Attesting Officer                                   Commissioner of Patents